April 29, 1969     H. M. LABORIT     3,441,565
PYRIDAZONE DERIVATIVES
Filed Feb. 21, 1966
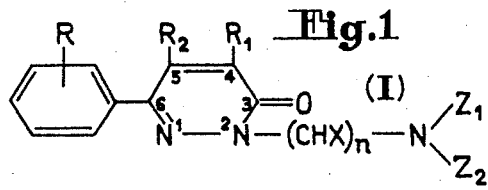
Fig.1
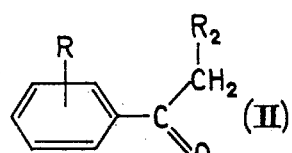
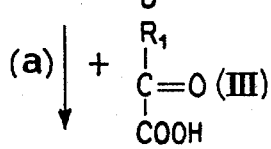
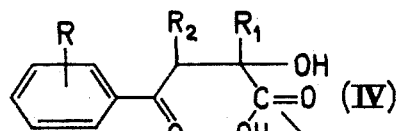
Fig.2
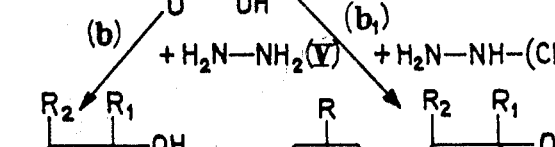
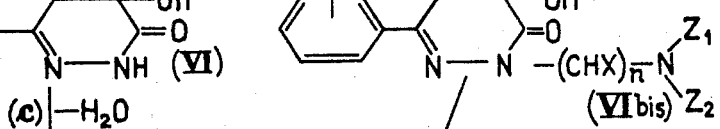
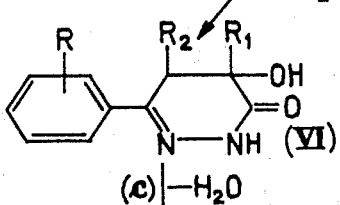
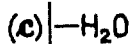
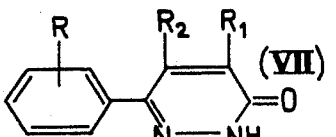
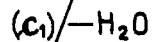
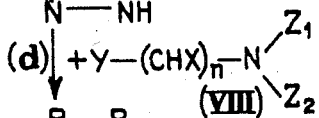
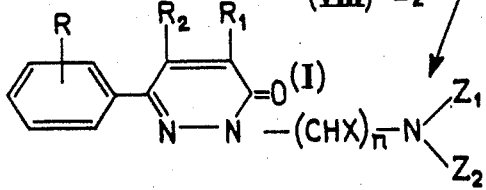
INVENTOR
HENRI MARIE LABORIT
BY Young + Thompson
ATTYS.

United States Patent Office 3,441,565
Patented Apr. 29, 1969

3,441,565
PYRIDAZONE DERIVATIVES
Henri Marie Laborit, Paris, France, assignor to
Seperic, a Swiss body corporate
Filed Feb. 21, 1966, Ser. No. 528,975
Claims priority, application Great Britain, Mar. 3, 1965,
9,040/65
Int. Cl. C07d 87/34, 51/00; C07c 65/02
U.S. Cl. 260—247.2                 7 Claims

ABSTRACT OF THE DISCLOSURE

The new derivatives are 4-alkyl-5-H or alkyl-6-phenyl or substituted phenyl-3-pyridazones or corresponding 4-hydroxy-pyridazinones substituted at position 2 by a di-alkylaminoalkyl group or a nitrogenated heterocycle-N-alkyl group. They are useful as psychotropic compounds.

---

The present invention relates to a family of new chemical compounds having therapeutic properties.

These compounds are those of general formula

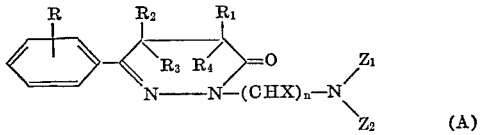

(A)

wherein R is at least a substituent in ortho-, meta- or para-position consisting of hydrogen, halogen, an alkyl, alkoxy or hydroxy group, $R_1$ is an alkyl group having 1–4 carbon atoms, $R_2$ is hydrogen or an alkyl group having 1–4 carbon atoms, X is hydrogen or a lower alkyl group n is an integer equal to 1 or more, the various X's, when n is greater than 1, not being necessarily identical, $Z_1$ and $Z_2$ are alkyl groups or, together with the nitrogen atom to which they are attached, form a heterocyclic nucleus which can comprise heteroatoms other than the nitrogen atom, and $R_3$ is hydrogen and $R_4$ is an OH group or $R_3$ and $R_4$ form together a double bond, together with their acid addition salts, and particularly of pharmaceutically acceptable salts.

Thus compounds (A) are the substituted 6-phenyl-3-pyridazones (I) of formula illustrated in FIG. 1 of the accompanying drawing, and the substituted 6-phenyl-3-pyridazinones (VI bis) having the formula given in FIG. 2 and from which compounds (I) are derived by dehydration.

The compounds (A) have a psychotropic action, namely they participate in treatments affecting the central nervous system.

The psychotropic action of these compounds appears to depend on the simultaneous presence on the pyridazone nucleus of an alkyl group ($R_1$) at position 4 and of a nitrogen atom on the side-chain attached to the nitrogen at position 2, separated from the latter by at least one carbon atom (group $(CHX)_n$).

To prepare these compounds, an original process is employed, the main stages of which are illustrated in FIG. 2 of the accompanying drawing.

This process is characterised by the use, as starting materials, of α-alcohol-γ-ketonic acids (IV) which are themselves prepared (stage a) by cold condensation in the presence of potassium hydroxide or other alkaline base in methanol or some other suitable solvent, of aryl-ketones (II), with the alkali metal salts of α-ketonic acids (III). After neutralization and removal of the solvent in vacuo, the remaining solution is extracted in an acid medium with ether or some other suitable solvent. The desired acid (IV) is extracted by dissolution in a bicarbonate solution followed by precipitation in an acid medium.

Starting from the α-alcohol-γ-ketonic acid (IV) thus obtained, the process according to the invention comprises condensing this acid or an ester thereof with a hydrazine of general formula $H_2N-NH-R_5$ wherein $R_5$ is hydrogen or a group:

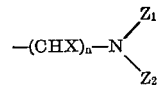

thereby obtaining a pyridazinone of formula

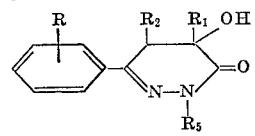

if desired, dehydrating this pyridazinone into the corresponding pyridazone and, where $R_5$ is hydrogen, introducing the

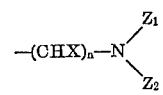

group by condensation with a halide of formula

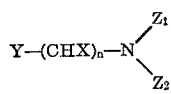

wherein Y is halogen, the dehydration and this condensation taking place in any order with respect to one another.

By this latter term is meant that condensation can be effected either prior to or after dehydration.

The various stages of the process will now be examined in greater detail with reference to FIG. 2. For purposes of clarity the case where, in hydrazine $H_2N-NHR_5$, $R_5$ is hydrogen and is distinguished from that where $R_5$ is

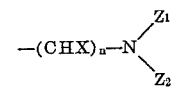

Thus, condensation of the α-alcohol-γ-ketonic acid (IV) with unsubstituted hydrazine (V) constitutes stage b, whereas condensation with substituted hydrazine (V bis) constitutes stage $b_1$.

The condensation with hydrazine according to stage b or $b_1$ is carried out in an appropriate solvent, such as butanol, which permits, owing to the formation of an azeotrope, the removal of the two water molecules resulting from the condensation. It should be noted this condensation can be carried out just as well with α-alcohol-γ-ketonic acids (IV) in the form of simple esters (such as methyl, ethyl or other simple esters).

Pyridazinones (VI and VI bis) constitute new compounds. While the former (VI) do not exhibit to any appreciable degree therapeutic properties and thus simply constitute intermediates this is not so with the latter (VI bis). Indeed, compounds (VI bis) exhibit therapeutic properties closely related to those of the corresponding dehydrated compounds: pyridazones (I). Thus, the process may be interrupted on production of compounds (VI bis).

On the other hand, when it is desired that the process results in the production of compounds (I) that are sometimes more active than compounds (VI bis), it is necessary that a dehydration be effected.

This dehydration may be effected both with compounds (VI)—stage c—and with compounds (VI bis)—stage $c_1$.

It is carried out by moderate heating of the pyridazinone in solution in an acid medium so as to produce the corresponding pyridazone which is separated by precipitation in cold water. As this dehydration concerns a tertiary hydroxyl group, it is carried out with a very good yield. This is one of the original features and one of the great advantages of the process according to the invention with respect to the known technique, resulting from the choice, in accordance with the invention, of α-alcohol-γ-ketonic acids (IV) as starting product. It should be noted that this dehydration is not necessarily preceded by the isolation of the pyridazinone. In fact, stages $b$ and $c$ or $b_1$ and $c_1$ may be carried out as a single stage by heating acid (IV) with hydrazine (V or V bis) in acetic medium and in the presence of a small amount of hydrochloric acid.

Stage $c_1$ results directly in the production of therapeutically active pyridazone (I). On the other hand, at the end of stage $c$, there is obtained a pyridazone (VII) unsubstituted at 2 that should be further aminoalkylated at said position. For this purpose (stage $d$) pyridazone (VII) is condensed with an aminoalkyl halide (compound VIII, $Y$=halogen). The condensation may be effected in the presence of an alkali metal alkoxide such as sodium methoxide or ethoxide in the corresponding alcohol. As a modification, this condensation may be carried out in water, in the presence of an alkaline base such as sodium hydroxide.

For the sake of convenience in the disclosure, stages $c$ and $d$ are described above in that order of succession. This, indeed, is one of the possible procedures. However, stages $c$ and $d$ may occur in the reverse order (not illustrated, for purposes of clarity of the drawing). In the latter case, pyridazinone (VI) is submitted to aminoalkylation to produce compound (VI bis), which brings us back to the case already examined.

Compounds (A): pyridazones (I) and pyridazinones (VI bis) have a basic character and can be converted into appropriate salts, for example hydrochlorides or organic acid salts to facilitate their utilization.

The examples below are given for the purpose of illustrating the invention.

EXAMPLE 1

Preparation of 2 - morpholinoethyl-4-methyl-6-phenyl-3-pyridazone (Compound (I), $R=R_2=X=H$, $R_1=CH_3$, $n=2$

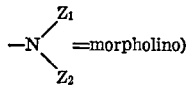  =morpholino)

Stage $a$.—Synthesis of α-hydroxy-α-methyl-γ-keto-γ-phenyl-butyric acid (IV).—In a 2-litre conical flask introduce 1 mol. pyruvic acid (III). Neutralize with a 20% potassium hydroxide solution, with stirring and cooling.

After neutralization, add 3 moles of acetophenone (II) followed by a solution of 70 g. of KOH in 1000 ml. of methyl alcohol. Under these conditions, the reaction mixture is homogeneous. Leave for 48 hours at room temperature.

At the end of this period of time, neutralize exactly with 10 N $H_2SO_4$ while cooling.

Evaporate the methanol under the vacuum of a filter-pump and acidify the remaining solution with 150 ml. of 10 N $H_2SO_4$. Extract with 3 portions of ether, there being employed a total amount of 1250–1500 ml. The ethereal layer is washed with two fractions of water, then extracted with 500–750 ml. of a 10% $KHCO_3$ solution.

Treat the bicarbonate layer with 150 ml. of 10 N $H_2SO_4$ and the required acid crystallizes after a few moments in an ice bath.

It could occur that the acid does not crystallize at this stage of the preparation. In this case, extract the acidified layer several times with ether. These extracts are washed with a little water, dried on anhydrous $MgSO_4$ and then evaporated under the vacuum of a filter-pump. The acid is then obtained in the form of a crystalline residue.

Filter and wash with a little isopropyl oxide. 77.65 g. of acid in the form of pearl-white crystals are obtained with a yield of 37.5%, it having the empirical formula $C_{11}H_{12}O_4$ (M.W.=208.21, M.P.=131° C).

Centesimal analysis.—Theoretical: Carbon, 63.45%; hydrogen, 5.81%. Found: Carbon, 63.87%; hydrogen, 5.87%.

Stage $b$.—Preparation of 4-hydroxy-4-methyl-6-phenyl pyridazinone (VI).—In a 250 ml. flask introduce 0.2 mole of α-hydroxy α-methyl γ-keto γ-phenyl butyric acid (IV) which is dissolved in a little n-butanol. Gradually add 0.22 mole of hydrazine hydrate, then 100–150 ml. of butanol.

Surmount the flask with a long condenser and distil the binary butanol-water azeotrope at 92° C. About 12 ml. of water are thus obtained. When the butanol distils in the limpid state, the operation is stopped and the excess of the remaining butanol is eliminated in the flask by evaporation until dry under the vacuum of a filter-pump.

Stage $c$.—Preparation of 4-methyl 6-phenyl pyridazone (VII).—The yellow crystalline residue obtained after evaporation to dryness in stage $b$ is dissolved in 140 ml. glacial acetic acid and 4 ml. concentrated hydrochloric acid, then left in the oven at 100° C. for 2 hours, while stirring from time to time.

At the end of this time, pour the solution into 420 ml. of water, while stirring in an ice bath. The pyridazone precipitates with a yield of 90% in the form of white crystals which, when recrystallized from 70% alcohol have the following characteristics: Empirical formula $C_{11}H_{10}N_2O$, M.W.=186.21, M.P.=190° C.

Centesimal analysis.—Theoretical: Carbon, 70.94%; hydrogen, 5.41%. Found: Carbon, 71.04%; hydrogen, 5.37%.

Stage $d$.—Synthesis of 2-morpholinoethyl 4-methyl-6-phenyl pyridazone (I).—In a 500 ml. Erlenmeyer flask introduced 0.06 mole of 4-methyl-6-phenyl pyridazone which is dissolved in 45 ml. of absolute alcohol. Add thereto a sodium ethoxide solution prepared by the action of 0.06 mole of sodium methoxide on 45 ml. of absolute alcohol.

Further, prepare a solution of 0.06 mole of morpholinochlorethane chloride (VIII) in 45 ml. of absolute alcohol to which a sodium ethoxide solution (action of 0.06 mole of $CH_3ONa$ on 45 ml. of absolute alcohol) is added. Mix the two solutions and reflux for 8 hours.

Thereafter, filter the sodium chloride formed on a Buchner filter in the vacuum of a filter pump. The filtrate is evaporated to dryness under the vacuum of the filter pump, and the free base is then obtained either in an oily form, which can be purified by a thorough distillation under a vacuum (B.P.=172–180° C. under 0.01 mm. Hg), or in a crystalline form. Before utilizing the crystalline base, ensure that it is free from any trace of morpholinoethanol by adding several times absolute alcohol and evaporating each time until dry. The pyridazone (I) thus obtained is then converted into the hydrochloride, as follows:

Dissolve the base obtained in 75 ml. of acetone dried on anhydrous $K_2CO_3$ or 40 ml. of isopropanol, and pass through this filtered solution a stream of gaseous HCl. After some time, a fine, white, slightly pink precipitate is formed. Filter on a sintered glass filter and dry.

This precipitate is purified by dissolving it in a minimum amount of 95% alcohol and reprecipitating with ether. It then possesses the following characteristics:

Centesimal analysis.—Theoretical: Carbon: 60.79%; hydrogen: 6.60%. Found: Carbon, 60.63%; hydrogen 6.66%. It melts at 89–91° C., its hydrochloride melting at 228–230° C.

When, in stage $d$, morpholinochlorethane chloride is replaced by dimethylaminochlorethane, diethylaminochlorethane or piperidinochlorethane chloride there is obtained, respectively, 2-dimethylaminoethyl-4-methyl-6- phenyl-3-pyridazone (the hydrochloride of which melts at 215° C.), 2-diethylaminoethyl-4-methyl-6-phenyl-3-pyridazone (the hydrochloride of which melts at 198° C.) and 2-piperidinoethyl - 4 - methyl - 6 - phenyl-3-pyridazone (the hydrochloride of which melts at 263–264° C.).

EXAMPLE 2

Preparation of 2-morpholinoethyl-4-methyl-6(metamethoxy)phenyl-3-pyridazone (Compound (I), $R=m-OCH_3$, $R_1=CH_3$, $R_2=X=H$, $n=2$

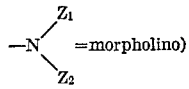

=morpholino)

This example illustrates the embodiment involving stages $b_1$ and $c_1$.

The $\alpha$-hydroxy $\gamma$-methyl $\gamma$-keto(metamethoxy)phenyl butyric acid (IV, R=metamethoxy, $R_1=CH_3$, $R_2=H$) is obtained according to the technique described at stage $a$ of Example 1.

In a flask surmounted with a rectification column are introduced 28 g. (0.117 mole) of the above named acid dissolved in about 120 ml. of butanol. Thereto are added 17.5 g. (0.117 mole) of morpholinoethylhydrazine (V bis). The water is removed by distillation of the butanol-water azeotrope at 92.5° C. Excess butanol is evaporated in vacuo.

The resultant pyridazinone (VI bis) is immediately dissolved in 120 ml. of glacial acetic acid and 24 ml. of concentrated hydrochloric acid. The solution is heated at 100° C. for 2 hours.

To produce the hydrochloride, pour the acetohydrochloric solution in a large excess of water and alcalinize with sodium hydroxide. The pyridazone base precipitates in oily form. It is extracted continuously overnight in ethereal solution.

The ether is evaporated, the corresponding oil is dissolved in anhydrous acetone, and is treated with a stream of gaseous hydrochloric acid.

Operating cautiously, the hydrochloride precipitates on addition of ordinary ether and after scratching.

Recrystallize from absolute alcohol.

Melting point of the hydrochloride: 208–209° C.

Melting point of the base (regenerated from the hydrochloride): 67–68° C.

EXAMPLE 3

Preparation of 2-morpholinoethyl-4-methyl-6-(metachloro)phenyl-3-pyridazone (Compound I, $R=m-Cl$, $R_1=CH_3$, $R_2=X=H$, $n=2$

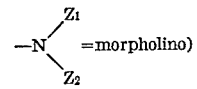

=morpholino)

This example illustrates the embodiment comprising effecting stages $b$ and $c$ in a single step.

The $\alpha$-hydroxy $\alpha$-methyl $\gamma$-keto-$\gamma$-(metachloro)-phenyl butyric acid (IV, R=metachloro) is obtained according to the technique described at stage $a$ of Example 1.

In a flask surmounted with a fractionation column, introduced 0.1 mole of the above named acid, dissolved in 36 ml. pure glacial acetic acid. To this solution add 0.11 mole of hydrazine hydrate diluted in 36 ml. glacial acetic acid.

Distil slowly 0.7 mole of water, then cool the solution to about 60–80° C. and add 2.08 ml. of concentrated hydrochloric acid. Distil slowly another 0.1 mole of water. To the still warm solution occupying a volume of 50 ml. add 30 ml. of boiling water. A slight turbidity is formed. Allow to crystallize by letting the solution rest at ambient temperature.

After condensation with morpholinochlorethane, there is obtained 2-morpholinoethyl-4-methyl-6-(metachloro)-phenyl-3-pyridazone that is transformed into hydrochloride or other salt according to the usual methods.

EXAMPLE 4

Preparation of 2-morpholinoethyl-4-isopropyl-6-phenyl-3-pyridazone (Compound I, $R=R_2=X=H$, $R_1$=isopropyl, $n=2$

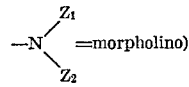

=morpholino)

This example illustrates the embodiment according to which stage $d$ is carried out in water.

The 4-isopropyl-6-phenyl-3-pyridazone is obtained according to stages a, b, c described in Example 1.

Dissolve in the hot 0.05 mole of this pyridazone in 100 ml. of water and 15 ml. of caustic soda lye and add, with stirring, 0.055 mole of morpholinochlorethane chloride dissolved in 20 ml. of water. Stirring of the hot solution is continued for a further fifteen minutes. The pyridazone crystallizes on cooling. After separation of the crystals, the base is transformed into hydrochloride or other salt according to the general methods.

A summary is given in the following tables of the physical chemical properties of the compounds obtained according to the above examples together with those of other compounds according to the invention obtained in analogous fashion. The tables give also the $LD_{50}$ in mg./kg. of these compounds, determined in mice by intraperitoneal route, unless otherwise indicated.

TABLE I.—PYRIDAZONES (I)—$R_2=H$—

| R | $R_1$ | $-(CHX)_n-$ | $N\begin{smallmatrix}Z_1\\Z_2\end{smallmatrix}$ | Empirical formula | Melting Point, °C. | Code No. | $LD_5$ |
|---|---|---|---|---|---|---|---|
| H | $CH_3$ | $CH_2-CH_2$ | Morpholino | $C_{17}H_{21}N_3O_2$ | Hydrochloride, 228–230; sulfamate, 164–184 (dec); aspartate, 91–92 and 269. | 246 | [1] 475 |
| H | $CH_3$ | $CH_2-CH_2-CH_2$ | do | $C_{18}H_{23}N_3O_2$ | Hydrochloride, 252 | 263 | 245 |
| H | $CH_3$ | $CH-CH_2$ $\|$ $CH_3$ | do | $C_{18}H_{23}N_3O_2$ | Hydrochloride, 162 | 364 | 185 |
| H | $CH_3$ | $CH_2$ | do | $C_{16}H_{19}N_3O_2$ | Hydrochloride, 153–154, base, 114 (dec.) | 250 | 800 |
| H | $CH_3$ | $CH_2-CH_2$ | Piperidino | $C_{18}H_{23}N_3O$ | Hydrochloride, 263–264 | 245 | |
| H | $CH_3$ | $CH_2-CH_2$ | Pyrrolidino | $C_{17}H_{21}N_3O$ | Hydrochloride, 246 | 354 | [2] 145 |
| H | $CH_3$ | $CH_2$ | $N(CH_3)_2$ | $C_{14}H_{17}N_3O$ | Hydrochloride, 125 | 251 | |
| H | $CH_3$ | $CH_2-CH_2$ | $N(CH_3)_2$ | $C_{15}H_{19}N_3O$ | Hydrochloride, 215 | 247 | |
| H | $CH_3$ | $CH_2-CH_2$ | $N(C_2H_5)_2$ | $C_{17}H_{23}N_3O$ | Hydrochloride, 198 | 244 | [2] 140 |
| H | $CH_3$ | $CH_2-CH_2-CH_2$ | $N(CH_3)_2$ | $C_{16}H_{21}N_3O$ | Hydrochloride, 201–203 | 368 | |
| H | $CH_3$ | $CH_2-CH_2$ | $N(CH)_2\begin{smallmatrix}CH_3\\CH_3\end{smallmatrix}$ | $C_{19}H_{27}N_3O$ | Hydrochloride, 222 | 367 | 155 |

See footnotes at end of table.

TABLE I—Continued

| R | $R_1$ | $-(CHX)_n-$ | $\diagdown N \diagup \begin{smallmatrix} Z_1 \\ Z_2 \end{smallmatrix}$ | Empirical formula | Melting Point, ° C. | Code No. | $LD_{50}$ |
|---|---|---|---|---|---|---|---|
| p-OH | $CH_3$ | $CH_2-CH_2$ | Morpholino | $C_{17}H_{21}N_3O_3$ | Hydrochloride, 245 (dec.); pasty at 192-4, base 160-163, pasty at 105. | 252 | 930 |
| p-OCH_3 | $CH_3$ | $CH_2-CH_2$ | do | $C_{18}H_{23}N_3O_3$ | Hydrochloride, 235-240; base, 92 | 254 | 450 |
| p-CH_3 | $CH_3$ | $CH_2-CH_2$ | do | $C_{18}H_{23}N_3O_2$ | Hydrochloride, 210; base, 83 | 255 | 415 |
| p-Cl | $CH_3$ | $CH_2-CH_2$ | do | $C_{17}H_{20}N_3O_2Cl$ | Hydrochloride, 225; base, 106 | 259 | 220 |
| m-CH_3 | $CH_3$ | $CH_2-CH_2$ | do | $C_{18}H_{23}N_3O_2$ | Hydrochloride, 175; base, 82-4 | 264 | 458 |
| m-OCH_3 | $CH_3$ | $CH_2-CH_2$ | do | $C_{18}H_{23}N_3O_3$ | Hydrochloride, 208-209; base, 67-68 | 270 | 440 |
| m-Cl | $CH_3$ | $CH_2-CH_2$ | do | $C_{17}H_{20}N_3O_2Cl$ | Hydrochloride, 230; base, 131 | 268 | 300 |
| m-OH | $CH_3$ | $CH_2-CH_2$ | do | $C_{17}H_{21}N_3O_3$ | Hydrochloride, 232 | 272 | 430 |
| o-OCH_3 | $CH_3$ | $CH_2-CH_2$ | do | $C_{18}H_{23}N_3O_2$ | Hydrochloride, 230-233 | 258 | 295 |
| o-Cl | $CH_3$ | $CH_2-CH_2$ | do | $C_{17}H_{20}N_3O_2Cl$ | Hydrochloride, 204-205 | 267 | 320 |
| o-CH_3 | $CH_3$ | $CH_2-CH_2$ | do | $C_{18}H_{23}N_3O_2$ | Hydrochloride, 213-215 | 269 | 345 |
| p-OH | $CH_3$ | $CH_2-CH_2$ | $N(CH_3)_2$ | $C_{15}H_{19}N_3O_2$ | Hydrochloride, 209-214; base, 140-3 | 256 | 330 |
| p-Cl | $CH_3$ | $CH_2-CH_2$ | $N(CH_3)_2$ | $C_{15}H_{18}N_3OCl$ | Hydrochloride, 194; base, 74 | 260 | 210 |
| H | $CH_2-CH_3$ | $CH_2-CH_2$ | Morpholino | $C_{18}H_{23}N_3O_2$ | Hydrochloride, 180-182 | 329 | 240 |
| H | $CH_2-CH_3$ | $CH_2-CH_2$ | $N(C_2H_5)_2$ | $C_{18}H_{25}N_3O$ | Hydrochloride, 152 | 357 | 138 |
| H | $CH_2-CH_3$ | $CH_2-CH_2$ | $N(CH_3)_2$ | $C_{16}H_{21}N_3O$ | Hydrochloride, 142 | 365 | 118 |
| H | $CH_2-CH_3$ | $CH_2-CH_2$ | Pyrrolidino | $C_{18}H_{23}N_3O$ | Hydrochloride, 215 | 356 | 120 |
| H | $CH_2-CH_3$ | $CH-CH_2$ \| $CH_3$ | Morpholino | $C_{19}H_{25}N_3O_2$ | Hydrochloride, 150-151 | 363 | 128 |
| H | $CH_2-CH_2-CH_3$ | $CH_2-CH_2$ | do | $C_{19}H_{25}N_3O_2$ | Hydrochloride, 178 | 352 | 220 |
| H | $CH(CH_3)_2$ | $CH_2-CH_2$ | do | $C_{19}H_{25}N_3O_2$ | Hydrochloride, 202 | 350 | 275 |
| H | $(CH_2)_3CH_3$ | $CH_2-CH_2$ | do | $C_{20}H_{27}N_3O_2$ | Hydrochloride, 166 | 349 | 162 |

[1] Per os 1,300.
[2] Per os 690.

TABLE II.—PYRIDAZONES (I)—$R_2=CH_3$—

| R | $R_1$ | $-(CHX)_n-$ | $\diagdown N \diagup \begin{smallmatrix} Z_1 \\ Z_2 \end{smallmatrix}$ | Empirical formula | Melting Point, ° C. | Code No. | $LD_{50}$ |
|---|---|---|---|---|---|---|---|
| H | $CH_3$ | $CH_2-CH_2$ | Morpholino | $C_{18}H_{23}N_3O_2$ | Hydrochloride, 245 | 257 | 370 |

TABLE III.—PYRIDAZINONES (VI bis)—$R_2=H$—

| R | $R_1$ | $-(CHX)_n-$ | $\diagdown N \diagup \begin{smallmatrix} Z_1 \\ Z_2 \end{smallmatrix}$ | Empirical formula | Melting Point, ° C. | Code No. | $LD_{50}$ |
|---|---|---|---|---|---|---|---|
| H | $CH_3$ | $CH_2-CH_2$ | Morpholino | $C_{17}H_{23}N_3O_3$ | Hydrochloride, 226 | 262 | 550 |
| p-OH | $CH_3$ | $CH_2-CH_2$ | do | $C_{17}H_{23}N_3O_4$ | Hydrochloride, 240; base, 175 | 253 | 930 |

As indicated previously, compounds (A) have a psychotropic activity that was made apparent by means of the three pharmacological tests described below:

(1) The first of these tests measures the inhibition of the number of twisting movements produced in mice on intraperitoneal injection of 0.25 ml. per mouse of a paraquinone solution containing 25 mg. per 100 ml.

The test compounds are administered to the animals ten minutes before the paraquinone injection and the twisting movements are counted during one hour for each animal.

Generally, injection of paraquinone alone causes fifty twisting movements per hour; were considered as being particularly active those compounds that inhibited more than 70% of such twisting movements at a dosage equivalent to one-fifth of the $LD_{50}$.

These particularly active compounds were the following (listed under their code number):

| 246 | 260 |
| 364 | 365 |
| 259 | 356 |
| 270 | 350 |
| 268 | 349 |
|  | 262 |

(2) The second of these tests measures the reaction time of mice to immersion of the tail of the animal in water heated to a temperature of 58° C.

When no product has been administered to the animal, the animal moves its tail after 1½ seconds.

The test compounds are administered to the animal fifteen minutes before the first immersion; immersion of the tail is carried out every thirty minutes during 2.5 hours.

Were considered as particularly active those compounds that extended by 3–4 seconds the reaction time of the animal at a dosage equivalent to one-fifth of the $LD_{50}$.

These particularly active compounds were the following (listed under their code numbers):

| 246 | 260 |
| 264 | 363 |
| 270 | 350 |
| 268 | 349 |
|  | 262 |

(3) The third test used was the study of the behaviour of mice and rats under the influence of a dosage equivalent to one-fifth of the $LD_{50}$ of the test compounds. This behaviour being evaluated with respect to the systemic sedation with decubitus or, on the contrary, by observing the aggressivity or the increased motivity of the animals.

Were found particularly sedative, according to this test, the products listed under the code numbers:

| 246 | 352 |
| 259 | 350 |
| 264 | 349 |
| 269 | 262 |
| 329 |  |

Were found particularly stimulating:

| 263 | 367 |
| 354 | 256 |
| 368 | 260 |

Having now described my invention, what I claim as new and desire to secure by Letters Patent is:

1. A compound of formula

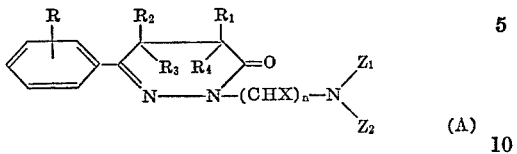
(A)

wherein:
R is a substituent in any one of the ortho-, meta- and para-positions selected from the group consisting of hydrogen, halogens and lower alkyl, lower alkoxy and hydroxy groups, $R_1$ is an alkyl group having 1–4 carbon atoms, $R_2$ is a member selected from the group consisting of hydrogen and alkyl groups having 1–4 carbon atoms, X is a member selected from the group consisting of hydrogen and lower alkyl groups, n is an integer from 1 to 3, the various X's, when n is greater than 1, not being necessarily identical, $Z_1$ and $Z_2$ are each a member selected from the group consisting of lower alkyl groups, and radicals such as $Z_1$ and $Z_2$ together with the nitrogen atom to which they are attached form a heterocyclic ring selected from the group consisting of morpholino, piperidino and pyrrolidino, $R_3$ is a member selected from the group consisting of hydrogen and a free valency forming a double bond with $R_4$ and $R_4$ is a member selected from the group consisting of the hydroxyl group and a free valency forming a double bond with $R_3$, and its non-toxic acid addition salts.

2. 2 - morpholinoethyl - 4 - methyl - 6 - phenyl - 3-pyridazone and the non-toxic acid addition salts thereof.

3. 2 - dimethylaminoethyl - 4 - methyl - 6 - (p - chloro)-phenyl-3-pyridazone and the non-toxic acid addition salts thereof.

4. 2 - morpholinoethyl - 4 - isopropyl - 6 - phenyl - 3-pyridazone and the non-toxic acid addition salts thereof.

5. 2 - morpholinoethyl - 4 - hydroxy - 4 - methyl - 6-m-tolyl-3-pyridazone and the non-toxic acid addition salts thereof.

6. 2 - morpholinoethyl - 4 - methyl - 6 - phenyl - 3-pyridazinone and the non-toxic acid addition salts thereof.

7. A compound of formula:

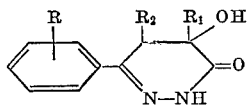

wherein:
R is a substitutent in any one of the ortho-, meta- and para-positions, selected from the group consisting of hydrogen, halogens, and lower alkyl, lower alkoxy and hydroxy groups, $R_1$ is an alkyl group having 1–4 carbon atoms, and $R_2$ is a member selected from the group consisting of hydrogen and the alkyl groups having 1–4 carbon atoms.

References Cited

UNITED STATES PATENTS

| | | | |
|---|---|---|---|
| 2,824,873 | 2/1958 | Bartram | 260—250 XR |
| 2,839,532 | 6/1958 | Druey et al. | 260—250 |
| 2,845,418 | 7/1958 | Kendall et al. | 260—250 XR |
| 2,945,857 | 7/1960 | Hammann | 260—250 |
| 3,045,014 | 7/1962 | Hensel et al. | 260—250 |
| 3,164,595 | 1/1965 | Burch et al. | 260—250 |
| 3,328,403 | 6/1967 | Nitta et al. | 260—247.2 XR |

FOREIGN PATENTS 1,355,220  2/1964  France.

Mustafa et al.: Tetrahedron, vol. 20 (March 1964), pp. 531–6.

HENRY R. JILES, *Primary Examiner.*

J. M. FORD, *Assistant Examiner.*

U.S. Cl. X.R.

260—250, 521, 999